July 21, 1925.                          1,546,858

W. NATHANSON ET AL

SEAMLESS CONNECTER TUBE

Filed April 7, 1924

Witnesses:

Inventors:
William Nathanson &
Jack Behm

By Joshua R H Cott
Their Attorney

Patented July 21, 1925.

1,546,858

UNITED STATES PATENT OFFICE.

WILLIAM NATHANSON AND JACK BEHM, OF CHICAGO, ILLINOIS, ASSIGNORS, BY DIRECT AND MESNE ASSIGNMENTS, OF ONE-HALF TO JACK BEHM AND ONE-HALF TO OTTO A. ZINKE, BOTH OF CHICAGO, ILLINOIS.

SEAMLESS CONNECTER TUBE.

Application filed April 7, 1924. Serial No. 704,712.

*To all whom it may concern:*

Be it known that we, WILLIAM NATHANSON and JACK BEHM, citizens of the United States, and residents of the city of Chicago, county of Cook, and State of Illinois, respectively, have invented certain new and useful Improvements in Seamless Connecter Tubes, of which the following is a specification.

Our invention relates to a seamless connecter tube, and more particularly to such a tube arranged to be mounted over the water outlet of an automobile radiator, and has for its object to provide a connecter tube made from a unitary piece of sheet metal and without any seam.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view of the invention mounted in position on the lower corner of a radiator;

Figure 1:
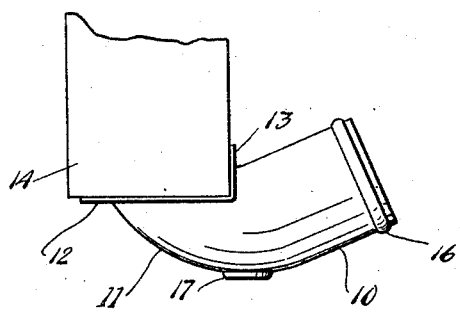
Figure 2:
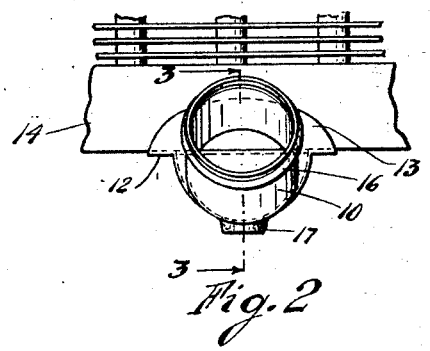
Fig. 2 is an end view thereof.
Figure 3:
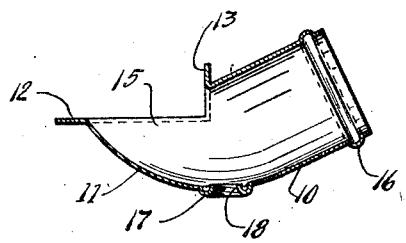
Fig. 3 is a vertical section taken on line 3—3 of Fig. 2.
Figure 4:
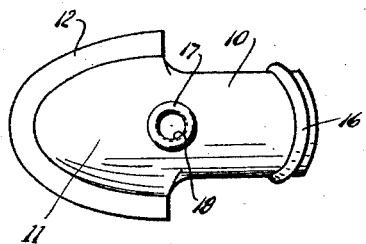
Fig. 4 is an inverted plan view.
Figure 5:
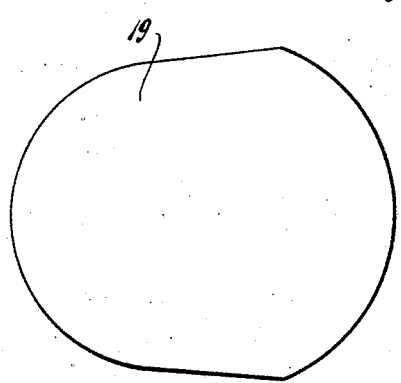
Fig. 5 represents a blank of sheet metal from which we form our seamless connecter tube.

The form of invention illustrated in the drawings comprises a connecter tube 10 having a main or body portion and having one end portion 11 curved laterally therefrom. Offset flanges 12 and 13 are formed at the outer end of said curved end portion and extend substantially at right angles to each other, being thus arranged for mounting the connecter tube on the lower corner of the water chamber of an automobile radiator 14, as by soldering or welding said flanges thereon. The opening 15 at said curved end, between said flanges, extends at an angle to the longitudinal axis of said tube, and is connected to the usual outlet opening of said lower water chamber. A bead 16 is formed adjacent the other end of said tube 10 to assist in retaining the end of a suitable hose thereon (not shown) with which said tube is connected with the water jacket of the automobile engine, in the usual well-known manner. An annular ridge 17 with an inwardly bent annular flange 18 is formed in said curved portion 11, providing a drain port at the lower part of said tube when mounted in position on the radiator, said port being preferably threaded to securely retain a suitable closure member (not shown).

Our connecter tube is formed from a substantially oval shaped blank or piece of sheet metal 19 preferably consisting of brass, or of any suitable ductile or malleable material, this blank of metal being subjected to a series of die press operations and providing the finished seamless connecter tube as disclosed. The series of die press operations or method of forming the connecter tube, briefly comprises the drawing of said metal blank into a shell or cap shape, then contracting and lengthening the closed upper ends of said shell, next forming offset flanges at the open end of said shell, then providing an opening in the closed upper end opposite the flanged end, then curving the flanged end and arranging the flanges at substantially right angles to each other for attachment to the corner of an automobile radiator, and then forming a drain port in the curved end.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. A seamless connecter tube of sheet metal having offstanding flanges at one end arranged at an angle to each other and providing an opening leading at an angle from the longitudinal axis of said tube, a flanged drain opening being formed in the side of said tube adjacent said flanges and said opening.

2. A seamless sheet metal connecter tube having one end curved laterally and provided with offstanding flanges arranged at an angle to each other for attachment to the corner of an automobile radiator, and an annular threaded flange arranged in said curved end to provide a drain port.

3. A seamless connecter tube consisting of an integral piece of sheet metal and containing a cylindrical body portion with a curved end portion having an opening extending transverse to the axis of said body portion, flanges at said open end extending at an angle to each other for attachment to the corner of an automobile radiator, the sheet metal adjacent the other end of said cylindrical portion being pressed out to form an annular bead, and a flanged and threaded drain port in the curved end portion.

In testimony whereof we have signed our names to this specification in the presence of two subscribing witnesses.

WILLIAM NATHANSON.
JACK BEHM.

Witnesses:
FREDA C. APPLETON,
MARGARET AUER.